(12) United States Patent
Watanabe

(10) Patent No.: US 7,782,584 B2
(45) Date of Patent: Aug. 24, 2010

(54) LOAD DRIVE CONTROLLER AND CONTROL SYSTEM

(75) Inventor: Hideo Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 604 days.

(21) Appl. No.: 11/806,865

(22) Filed: Jun. 5, 2007

(65) Prior Publication Data

US 2008/0002326 A1 Jan. 3, 2008

(30) Foreign Application Priority Data

Jun. 29, 2006 (JP) ............................. 2006-179045
Jan. 25, 2007 (JP) ............................. 2007-015209

(51) Int. Cl.
*H02H 5/04* (2006.01)
*H01H 73/22* (2006.01)

(52) U.S. Cl. ..................... 361/103; 361/104; 361/106; 337/153

(58) Field of Classification Search ................. 361/103, 361/104, 106; 337/153
See application file for complete search history.

(56) References Cited

U.S. PATENT DOCUMENTS

| | | | | |
|---|---|---|---|---|
| 5,119,265 | A | * | 6/1992 | Qualich et al. ............... 361/103 |
| 5,163,234 | A | * | 11/1992 | Tsukamoto et al. ............ 34/487 |
| 6,037,567 | A | | 3/2000 | Inoue et al. |
| 6,166,351 | A | | 12/2000 | Yamamoto |
| 6,661,633 | B1 | * | 12/2003 | Furuta et al. ................. 361/103 |
| 6,735,065 | B2 | * | 5/2004 | Graf et al. .................... 361/103 |
| 7,148,453 | B2 | | 12/2006 | Bohlender et al. |
| 2006/0289462 | A1 | | 12/2006 | Muramatsu et al. |

FOREIGN PATENT DOCUMENTS

DE 19728589 11/1998

OTHER PUBLICATIONS

European Search Report dated Sep. 28, 2007 in corresponding European Patent Application No. 07011266.9 (and English translation).

* cited by examiner

*Primary Examiner*—Stephen W Jackson
*Assistant Examiner*—Zeev Kitov
(74) *Attorney, Agent, or Firm*—Posz Law Group, PLC

(57) ABSTRACT

A load drive controller for controlling a heat generating member by a switching element includes a temperature detection portion for detecting a physical quantity of a level corresponding to a temperature of the switching element, a protection function portion for outputting an abnormality signal corresponding to an overheated state of the switching element when the physical quantity detected by the temperature detection portion is larger than a value, a control portion for causing the heat generating member to generate heat by driving the switching element via a driving portion. Furthermore, the control portion causes a temperature adjustment portion to increase the temperature of the heat generating member when the abnormality signal is input from the protection function portion.

16 Claims, 8 Drawing Sheets

X: MONITORING TIME

LOAD DRIVE CONTROLLER AND CONTROL SYSTEM

CROSS REFERENCE TO RELATED APPLICATION

This application is based on Japanese Patent Applications No. 2006-179045 filed on Jun. 29, 2006, and No. 2007-15209 filed on Jan. 25, 2007, the contents of which are incorporated herein by reference in its entirety.

BACKGROUND OF THE PRESENT INVENTION

1. Field of the Present Invention

The present invention relates to a load drive controller adapted to prevent a drive transistor for driving a load from overheating, and to a load drive control system having a control means.

2. Description of the Related Art

A control unit having a temperature protection function of preventing a drive transistor for driving a load from overheating has hitherto been proposed in, for example, JP-A-2005-217399. Specifically, a control unit is proposed which includes a circuit substrate with an electric circuit formed thereon, a drive transistor installed on the circuit substrate for driving a load, a cutoff member for electrically connecting the drive transistor with the electric circuit separated from the drive transistor, and an operation member adapted to be inductively activated when the drive transistor overheats.

In such a control unit, the operation member is actuated when the temperature on the drive transistor exceeds a high temperature that is unacceptable. That is, when the operation member is pressed against the cutoff member, the cutoff member is then moved to be separated from the circuit substrate, so that the drive transistor and the electric circuit are electrically disconnected. In this way, the current passing through the drive transistor is stopped, thereby protecting the drive transistor from heat.

Although the above-described known technique can protect the drive transistor from overheating, the current passing through the drive transistor is completely stopped, thereby leading to shutdown of the control unit itself. In other words, this leads to termination of the function of the entire system using the control unit, thereby affecting users using the system employing the control unit.

SUMMARY OF THE PRESENT INVENTION

The present invention has been accomplished in view of the foregoing problems, and it is an object of the present invention to provide a load drive controller that can prevent shutdown of an entire system using a switching element (e.g., drive transistor) for driving a load, due to overheating of the switching element.

It is another object of the present invention to provide a load drive control system which can prevent overheating of a switching element such as a drive transistor for driving a load.

According to an aspect of the present invention, a load drive controller is for controlling a temperature of a heat generating member by switching energization of the heat generating member from a power source using a switching element via a driving portion for driving the switching element. Here, heat generated by the heat generating member is absorbed by a temperature adjustment portion so as to adjust the temperature of the heat generating member. In this case, the load drive controller includes a temperature detection means for detecting a physical quantity of a level corresponding to a temperature of the switching element, a protection function means for outputting an abnormality signal corresponding to an overheated state of the switching element when the physical quantity detected by the temperature detection means exceeds a value at which the switching element is estimated to be in the overheated state, and a control means for causing the heat generating member to generate heat by driving the switching element via the driving portion. Furthermore, the control means causes the temperature adjustment portion to increase the temperature of the heat generating member when the abnormality signal is input from the protection function means.

Accordingly, when the switching element is overheated, the temperature adjustment portion increases the temperature of the heat generating member itself to increase a resistance of the heat generating member. This can reduce the current passing through the switching element for energizing the heat generating member. Thus, the switching element itself can be prevented from being broken down due to the overheating of the switching element, thereby preventing a shutdown of an entire system using the heat generating member.

The control means may include abnormality determination means for determining whether the abnormality signal is input from the protection function means, and temperature control means for causing the temperature adjustment portion to adjust the temperature of the heat generating member so as to increase the temperature of the heat generating member when the abnormality determination means determines that the abnormality signal is input from the protection function means. Alternatively, the protection function means may output a command to the driving portion to drive the switching element such that current passing through the switching element is decreased when the physical quantity input from the temperature detection means exceeds the value at which the switching element is estimated to be in the overheated state. Alternatively, the control means may includes abnormality determination means for determining whether the abnormality signal is input from the protection function means, time monitoring means for monitoring whether the abnormality signal continues to be input for a predetermined time period when the abnormality determination means determines that the abnormality signal is input, and stopping means for causing the driving portion to stop driving of the switching element and for stopping driving of the temperature adjustment portion when the time monitoring means determines that the abnormality signal continues to be input for the predetermined time period.

The control means may control the driving portion to stop the driving of the switching element when the temperature adjustment portion performs a normal control in a case where the abnormality signal continues to be input for a predetermined time period. Furthermore, the control means may include a driving continuation means for continuing the driving of the temperature adjustment portion when the driving of the switching element is stopped by the driving portion. In addition, when the driving of the temperature adjustment portion is continued via the driving continuation means, the control means may input an idle-up signal for increasing a rotation speed of an engine to an engine control means so as to increase the rotation speed of the engine.

According to another aspect of the present invention, a load drive controller may be suitably used in a case where a temperature adjustment portion is provided for adjusting the temperature of the heat generating member by absorbing heat generated from the heat generating member and heat generated from a heater heated by an engine-cooling water supplied from an engine. In this case, the heat generation of the switching element can be reduced to decrease the temperature of the switching element. Thus, even when the driving of the heat generating member by the switching element is stopped, the temperature adjustment portion can continue absorb heat from the heater. That is, the heat can be absorbed from the heater to which the engine-cooling water is supplied, thereby to continue making warm air by using the heater. As mentioned above, even when the driving of the switching element is stopped, the warm air can be continuously made without stopping the entire load drive controller.

According to another aspect of the present invention, a load drive control system includes a heat generating member which generates heat when current is supplied thereto, a switching element for switching energization of the heat generating member from a power source, a driving portion for driving the switching element to be turned on or off, a temperature adjustment portion for adjusting a temperature of the heat generating member by absorbing heat generated from the heat generating member, a temperature detection portion located to detect a physical quantity of a level corresponding to a temperature of the switching element, a protection function portion which outputs an abnormality signal corresponding to an overheated state of the switching element when the physical quantity detected by the temperature detection portion exceeds a value at which the switching element is estimated to be in the overheated state, and a control portion for causing the heat generating member to generate heat by driving the switching element via the driving portion. Furthermore, the control portion controls the temperature adjustment portion so as to increase the temperature of the heat generating member when the abnormality signal is input from the protection function portion. Accordingly, the system can effectively prevent overheating of the switching element without stopping the entire system.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

A first embodiment of the present invention will be described below with reference to the accompanying drawings. A load drive controller as described in this embodiment is used, for example, for control of air conditioning of a vehicle, so as to protect a drive transistor for energizing and driving a PTC from overheating.

Figure 1:
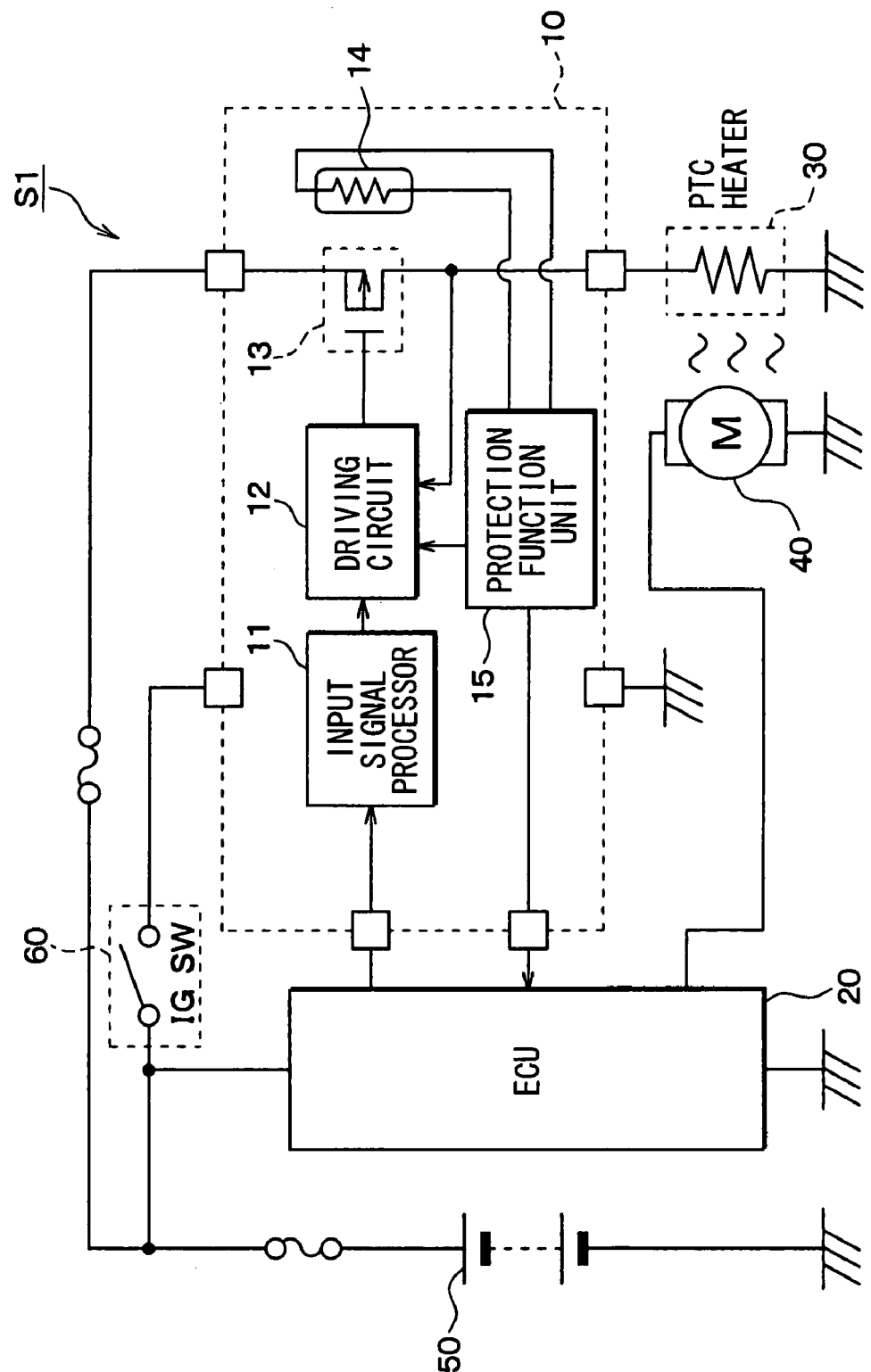
FIG. 1 is a schematic diagram of a load drive control system according to a first embodiment of the present invention.

FIG. 1 shows a configuration diagram of a load drive control system according to the first embodiment of the present invention. As shown in the figure, the load drive control system S1 includes a load drive controller 10, an ECU 20 (control means), a PTC heater 30 (heat generating member), and a blower motor (temperature adjustment portion) 40.

The load drive controller 10 and the ECU 20 are actuated by being energized by a power source 50, and the PTC heater 30 is actuated by being energized by the power source 50 via the load drive controller 10. The load drive controller 10 is energized by the power source 50 when a vehicle ignition switch 60 is turned on.

The load drive controller 10 includes an input signal processor 11, a driving circuit 12 (driving portion), a drive transistor 13 (switching element), a thermistor 14 (temperature detection means), and a protection function unit 15 (protection function means).

The input signal processor 11 serves as an interface between the ECU 20 and the load drive controller 10. The input signal processor 11 receives a command signal for driving the PTC heater 30 from the ECU 20, and outputs an input processing signal corresponding to the command signal to the driving circuit 12.

The driving circuit 12 inputs an electric signal to a gate of the drive transistor 13 to drive the PTC heater 30 via the drive transistor 13. Specifically, the driving circuit 12 inputs the input processing signal for driving the drive transistor 13 from the input signal processor 11. When the PTC heater 30 is driven to be fully turned on (duty ratio of 100%) according to the input processing signal, the driving circuit 12 generates a drive signal for full-on driving of the PTC heater 30 to output it to the drive transistor 13. When the PTC heater 30 is PWM driven (for example, duty ratio of 50%), a drive signal for PWM driving of the drive transistor 13 is generated and output to the drive transistor 13.

The driving circuit 12 has a function of monitoring whether or not the drive transistor 13 energizes the PTC heater 30 serving as the load, by inputting a source voltage of the drive transistor 13.

The drive transistor 13 is to energize the PTC heater 30. The drive transistor 13 is connected to a high side of the PTC heater 30, and has a gate connected to the driving circuit. The drive signal is input from the driving circuit 12 to the gate of the drive transistor 13, so that the drive transistor 13 is adapted to drive switching of the PTC heater 30 according to the duty ratio of the drive signal. In this embodiment, for example, a Pch type MOS transistor is adopted as the above-mentioned drive transistor 13.

The thermistor 14 is an element whose resistance value varies depending on temperatures. In fact, a constant voltage is applied to the thermistor 14 in combination with another resistance. And a change in resistance ratio is converted into a voltage level by the protection function unit 15 to be described later to be read out. This thermistor 14 is disposed near the drive transistor 13 and used to detect the temperature of the drive transistor 13.

The protection function unit 15 serves to output a diagnostic signal (abnormality signal) to the ECU 20 when the temperature of the drive transistor 13 detected by the thermistor 14 is an abnormal temperature at which the drive transistor 13 cannot operate normally.

The protection function unit 15 outputs a command to the driving circuit 12 to modify a driving pattern of the drive transistor 13 when the temperature of the drive transistor 13 detected by the thermistor 14 is the abnormal temperature. When the temperature of the drive transistor 13 corresponding to a voltage input from the thermistor 14 is not abnormal one, the protection function unit 15 does not operate.

The ECU 20 is provided to drive the PTC heater 30 via the load drive controller 10. The ECU 20 has a function of driving the blower motor 40 by outputting a blower signal to the blower motor 40, a function of driving the PTC heater 30 via the load drive controller 10, and a function of decreasing the number of revolutions of the blower motor 40 when the drive transistor 13 is in an abnormal state of temperature. In the embodiment, the blower signal is generated by the ECU 20 as an electric voltage signal corresponding to the number of revolutions of the blower motor 40.

The ECU 20 is constructed of a microcomputer and the like including, for example, a memory, and a CPU. The ECU 20 has a protection program for performing protection processing which involves decreasing an air volume of the blower motor 40 when the drive transistor 13 is in the abnormal state of temperature. The protection program is stored in the memory and executed by the CPU.

The PTC heater 30 is a heat generating member. That is, the PTC heater is heated and generates heat by being supplied with current input from the power source 50, together with the operation of the drive transistor 13 of the load drive controller 10. Such a PTC heater 30 for use may include, for example, a structure having a PTC element sandwiched between two sheets of electrodes.

Figure 2:
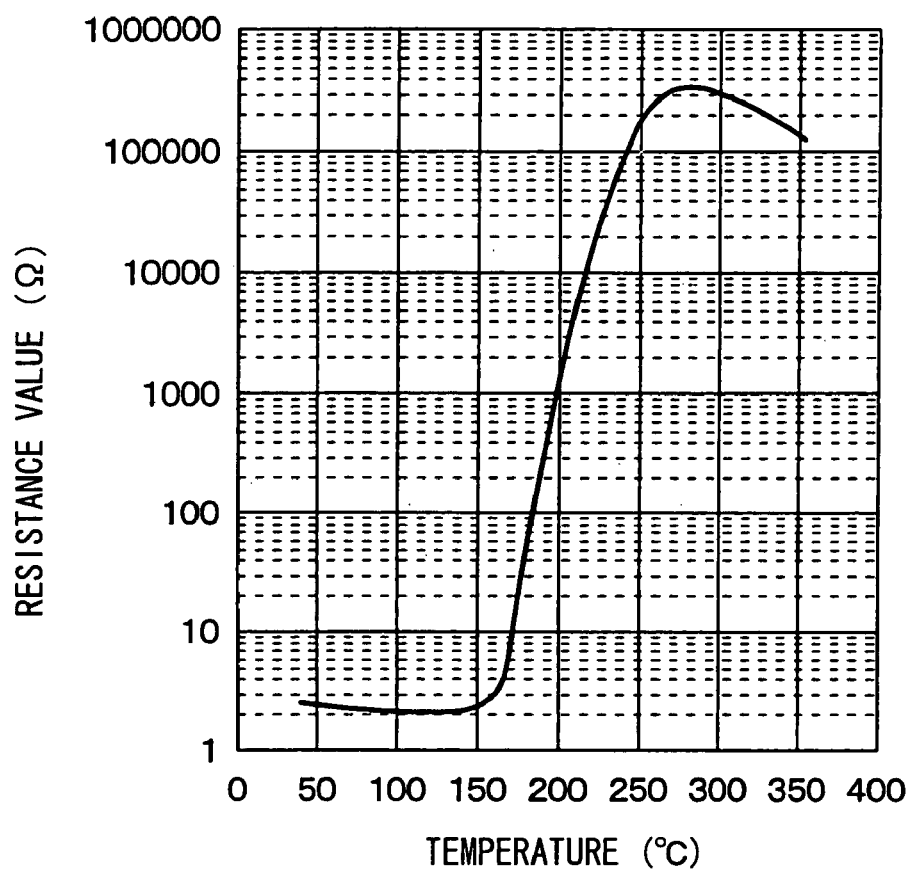
FIG. 2 is a graph showing a relationship between the temperature of a PTC heater and the resistance value thereof.

FIG. 2 shows the relationship between the temperature and resistance value of the PTC heater 30. This figure shows that the higher the temperature of the PTC heater 30, the higher the resistance value of the PTC heater 30. The current value of electrical current passing through the PTC heater 30 decreases with temperature increase of the PTC heater 30. When the load drive control system S1 normally operates, the temperature of the PTC heater 30 is, for example, around 150 degrees.

The blower motor 40 drives and operates a blower 41 to generate air having the temperature corresponding to the heat generation of the PTC heater 30 by blowing airstreams against the PTC heater 30. Specifically, the blower motor 40 is for creating air flow for absorbing heat generated from the PTC heater 30, and adjusts an amount of heat absorbed from the PTC heater 30 in response to the air amount, thereby adjusting the temperature of the PTC heater 30 itself. That is, the air generated by the blower 41, due to the operation of the blower motor 40, is used to absorb the heat generated by the PTC heater 30.

In the embodiment, the volume of air generated by the blower 41 is adjusted by increasing or decreasing the number of revolutions of the blower motor 40 according to the blower signal input from the ECU 20.

Figure 3:
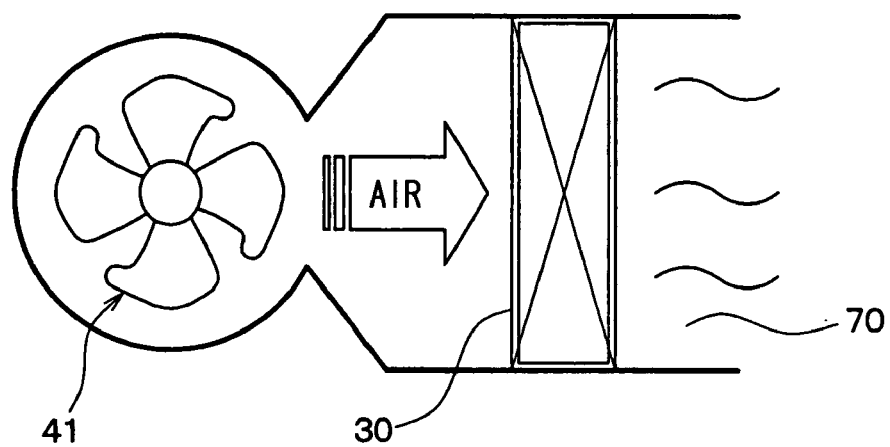
FIG. 3 is a schematic diagram showing the PTC heater and a blower.

FIG. 3 schematically shows a blower unit constructed of the PTC heater 30 and the blower 41 having the blower motor 40. When the air from the blower 41 is blown to the PTC heater 30 generating heat by driving the blower motor 40, warm air is heated by the PTC heater 30 and is blown from the PTC heater 30 into an air conditioning duct 70.

The control of the load drive control system SI will be normally performed as follows. First, a command signal for driving the PTC heater 30 is output from the ECU 20 to the load drive controller 10. The command signal includes information on a method of driving the drive transistor 13 (full-on drive or PWM drive).

The command signal is input from the ECU 20 to the input signal processor 11 of the load drive controller 10. An input processing signal according to the contents of the command signal is input from the input signal processor 11 to the driving circuit 12. The driving circuit 12 generates a drive signal (gate voltage) included in the input processing signal and corresponding to the driving method of the drive transistor 13. The drive signal is input to the gate of the drive transistor 13. This allows the drive transistor 13 to be driven fully on, or to be PWM driven. Once the drive transistor 13 is driven, the PCT heater 30 generates heat by being energized from the power source 50 via the drive transistor 13.

When a blower signal is input from the ECU 20 to the blower motor 40, the blower motor 40 is driven to cause the blower 41 to blow air. When the PTC heater 30 and the blower motor 40 are driven, as shown in FIG. 3, air blown from the blower 41 is warmed by the heat generated from the PTC heater 30, and is blown into the air conditioning duct 70. The normal control of the load drive control system has been described above.

Figure 4:
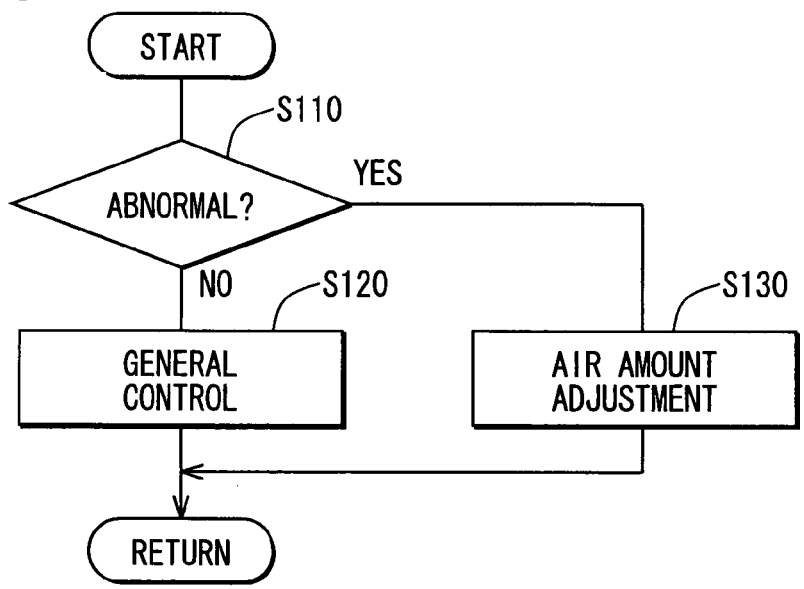
FIG. 4 is a flowchart showing a protection control program according to the first embodiment.

Now, the protection process performed by the above-mentioned ECU 20 will be described with reference to FIG. 4. FIG. 4 is a flowchart showing contents of the protection program. In this embodiment, when the ECU 20 starts to be energized by the power source 50, the flow diagram shown in FIG. 4 will be started according to the protection program.

At Step S110, it is determined whether the temperature of the drive transistor 13 is abnormal or not. This determination of Step S110 is performed by determining whether or not a diagnostic signal is input from the protection function unit 15 of the load drive controller 10. That is, when a voltage signal input from the thermistor 14 into the protection function unit 15 exceeds a threshold value at which the drive transistor 13 is supposed to be in an overheated state, the diagnostic signal is input from the protection function unit 15 to the ECU 20. In this way, it is determined whether the diagnostic signal is input to the ECU 20 or not. When the diagnostic signal is determined not to be input at Step S110, the control program proceeds to Step S120.

At Step S120, the normal control is performed. As mentioned above, the control is performed by the ECU 20 to drive the PTC heater 30 and the blower motor 40. Thereafter, the control program returns to Step S110, and the load drive controller 10 monitors again the temperature of the drive transistor 13.

When the diagnostic signal is determined to be input from the load drive controller 10 to the ECU 20 at Step S110, the air volume of the blower 41, that is, the number of revolutions of the blower motor 40 is decreased at Step S130 (corresponding to temperature control means). Specifically, a blower signal in which the number of revolutions of the blower motor 40 is decreased is generated by the ECU 20, and this blower signal is input to the blower motor 40. Thus, the number of revolutions of the blower motor 40 is decreased as compared to that of the blower motor 40 normally controlled at Step S120. Accordingly, the air volume from the blower 41 is decreased.

Since the air volume blown to the PTC heater 30 also decreases with decreasing air volume of the blower 41, the amount of heat obtained from the PTC heater 30 is decreased, resulting in an increase in temperature of the PTC heater 30 itself. As mentioned above, because the PTC heater 30 is a heat generating resistance member, the resistance value of the PTC heater 30 also increases with increasing temperature of the PTC heater 30 as shown in FIG. 3. That is, the electrical current passing through the drive transistor 13 decreases with a decreasing amount of the electrical current passing through the PTC heater 30. Thus, the heat generation of the drive transistor 13 can be reduced, thereby decreasing the temperature of the drive transistor 13.

Thereafter, the control operation will returns to Step S110, and the load drive controller 10 monitors again the temperature of the drive transistor 13. The control process at Step S130 described above is performed to decrease the temperature of the drive transistor 13. When no diagnostic signal is input to the ECU 20, the normal control is performed again.

As described above, in this embodiment, when the drive transistor 13 is overheated, the number of revolutions of the blower motor 40 is decreased by the ECU 20 to increase the temperature of the PTC heater 30. That is, when the number of revolutions of the blower motor 40 is lowered, the heat generated from the PTC heater 30 is not absorbed by air blown by the blower 41, or the heat absorbing amount due to air blown by the blower 41 can be reduced. This increases the temperature of the PTC heater 30, resulting in an increase in resistance value of the PTC heater 30.

In this way, the temperature of the PTC heater 30 itself is increased to increase the resistance value of the PTC heater 30, thereby enabling a decrease in electric current passing through the drive transistor 13 for energizing the PTC heater 30. Thus, the drive transistor 13 can be prevented from being broken due to the overheating of the drive transistor 13, thereby preventing the shutdown of the entire system using the PTC heater 30.

Second Embodiment

In this embodiment, different parts from the first embodiment will be mainly described below. In the above-described first embodiment, the volume of air blown against the PTC heater 30 is decreased and the temperature of the PTC heater 30 is increased to increase the resistance value thereof, resulting in decrease in current passing through the PTC heater 30. Together with this, in the first embodiment, the current passing through the drive transistor 13 is also decreased so as to reduce the heat generation of the drive transistor 13, thereby preventing the stopping of the entire system.

However, when the overheating of the drive transistor 13 is not restrained and the diagnostic signal is subsequently input to the ECU 20 even while the air volume of the blower 41 is decreased, it is preferable to stop the entire system from a viewpoint of protection of the drive transistor 13.

Accordingly, in the second embodiment, the ECU 20 has a function of stopping the entire system in addition to the functions shown in the first embodiment. That is, the ECU 20 has a stopping program for stopping the entire system when the abnormal temperature of the drive transistor 13 continues.

Figure 5:
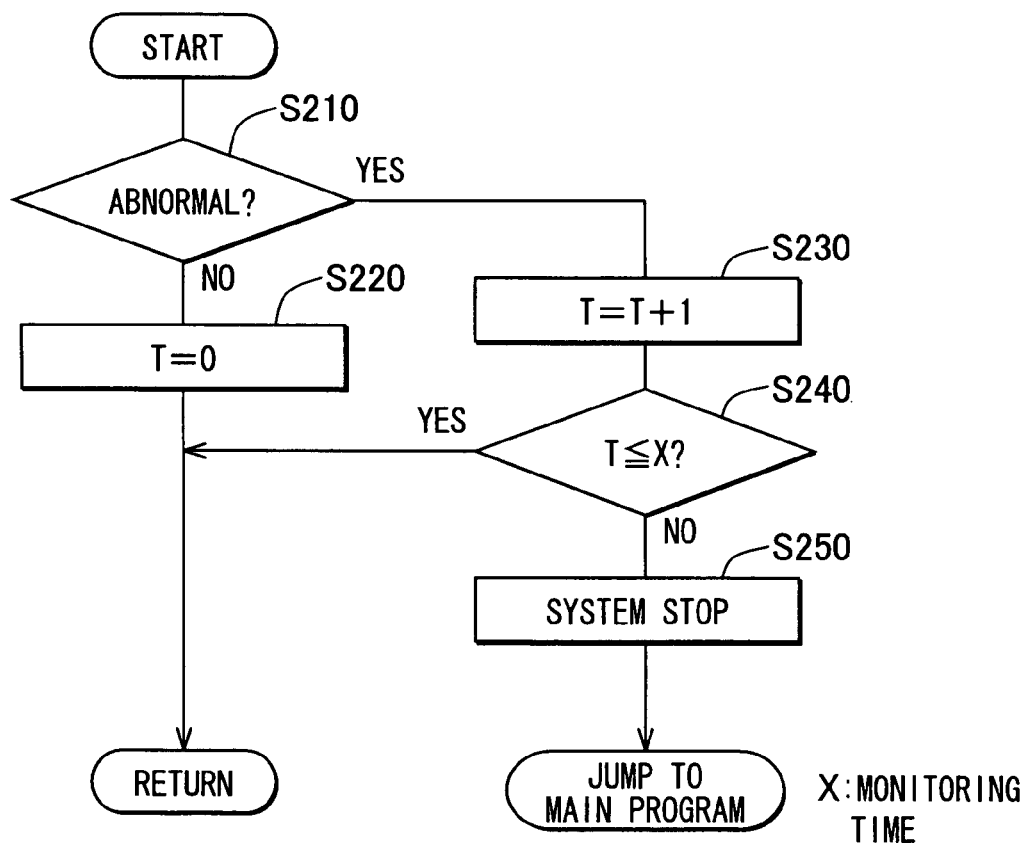
FIG. 5 is a flowchart showing a stopping control program in a second embodiment of the present invention.

FIG. 5 is a flowchart showing contents of the stopping program. The control procedure shown in this flowchart is started when the ECU 20 starts to be energized from the power source 50. The flowchart shown in FIG. 5 is executed independently from the flowchart shown in FIG. 4.

In Step S210, the same process as that in Step S110 is carried out. That is, it is determined whether the temperature of the drive transistor 13 is abnormal or not in Step S210. When the temperature of the drive transistor 13 is determined not to be abnormal in Step S210, the control program proceeds to Step S220.

In Step S220, time T is set to zero (=0). The control program returns to Step S210, and the temperature of the drive transistor 13 is subsequently monitored.

When the temperature of the drive transistor 13 is determined to be abnormal in Step S210, one (1) is added to the time T in Step S230, thereby providing new time T (T=T+1) as the result of this computation.

In Step S240, it is determined whether or not the time T satisfies the condition of T≦X. The term X as used herein is a monitoring time for monitoring the abnormal temperature of the drive transistor 13 until the entire system is stopped. That is, it is determined whether or not the time T counted in Step S230 exceeds the monitoring time X. In this embodiment, means for executing Step S240 corresponds to time monitoring means.

When the time T satisfies the condition of T≦X in Step S240, it is determined that the time T does not reach the monitoring time X, and the control program returns to Step S210. While the temperature of the drive transistor 13 is kept abnormal, Steps S210, 230, and 240 are repeated to count the time. When the time T does not satisfy the condition of T≦X, it is determined that the time T exceeds the monitoring time X, and the control program proceeds to Step S250.

In Step S250, the load drive control system S1 is stopped. Specially, the outputting of the command signal from the ECU 20 to the load drive controller 10 is stopped, and also the outputting of the blower signal to the blower motor 40 is stopped. Thus, the operations of the PTC heater 30 and the blower motor 40 are stopped, so that the operation of the entire system is brought into a stopped state. Note that means for executing Step S250 corresponds to stopping means.

Thereafter, the control operation jumps to a main program for operating the ECU 20, for example, so that the stopping of the system is maintained until the ECU 20 is restarted. In this case, this procedure shown in the flowchart of FIG. 4 is forcefully terminated.

As mentioned above, in the second embodiment, when the abnormal temperature of the drive transistor 13 is maintained even when the air volume of the blower 41 is decreased in the load drive control system S1, the entire system can be stopped or shut down to achieve the protection of the drive transistor 13. That is, when the abnormal temperature of the drive transistor 13 is not released even by reducing the air volume of the blower 41 in the load drive control system S1, the entire system can be stopped or shut down to achieve the protection of the drive transistor 13.

Third Embodiment

In this embodiment, only different parts from each of the above-mentioned embodiments will be described below. In the above second embodiment, the entire load drive control system is controlled to stop under a certain condition. When a main heating system, that is, a heater core is provided in the air conditioning unit, the blower motor 40 preferably continues to be driven without stopping the entire system so as not to stop the heating. Reference will now be made to a load drive control system including the heater core in the air conditioning unit.

Figure 6:
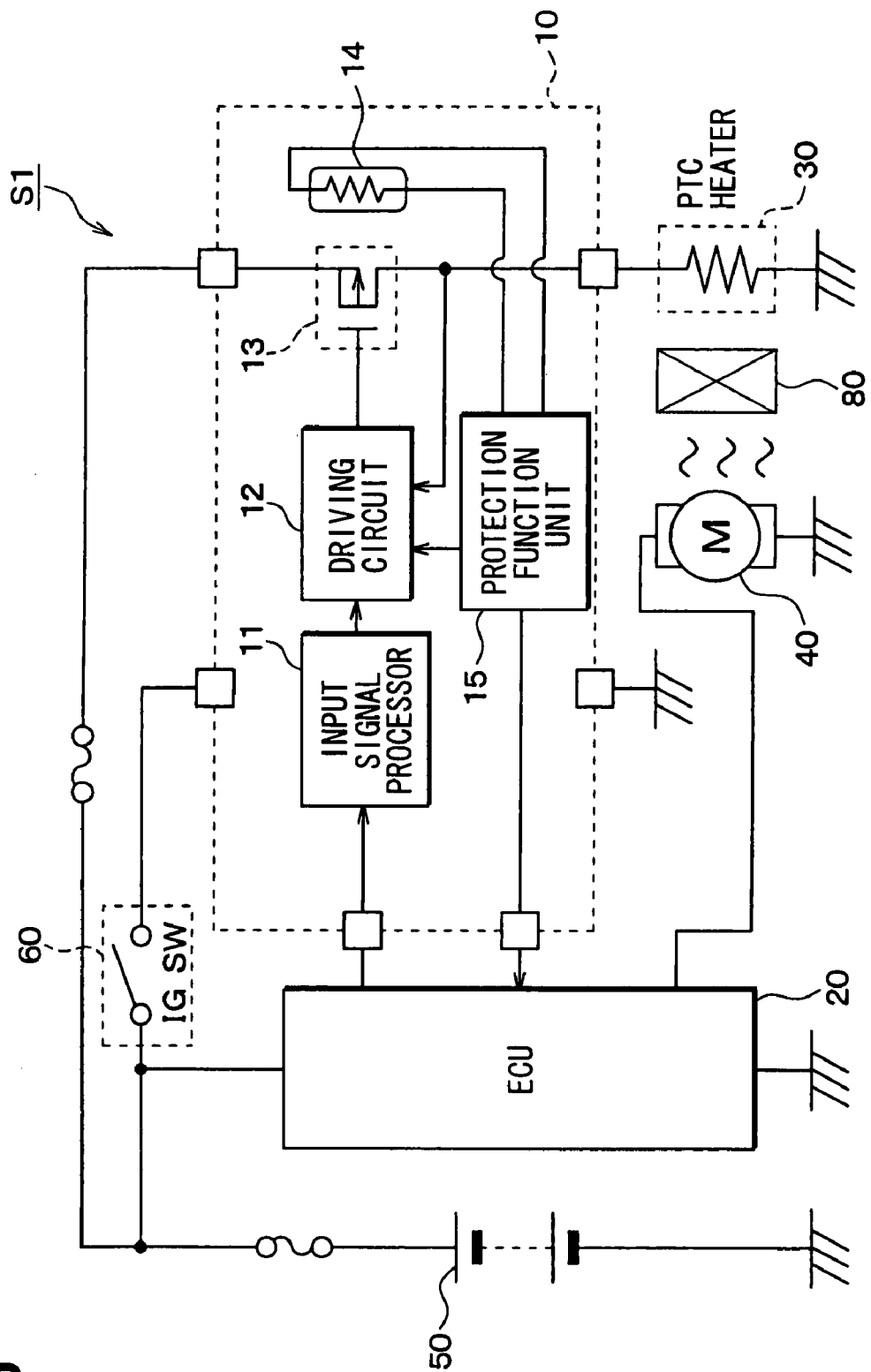
FIG. 6 is a schematic diagram of a load drive control system according to a third embodiment of the present invention.

As shown in FIG. 6, a load drive control system of the third embodiment is provided with a heater core 80 in the system shown in FIG. 1.

The heater core 80 serves to heat air passing through the heater core 80 by an engine coolant supplied from an engine

Figure 7:
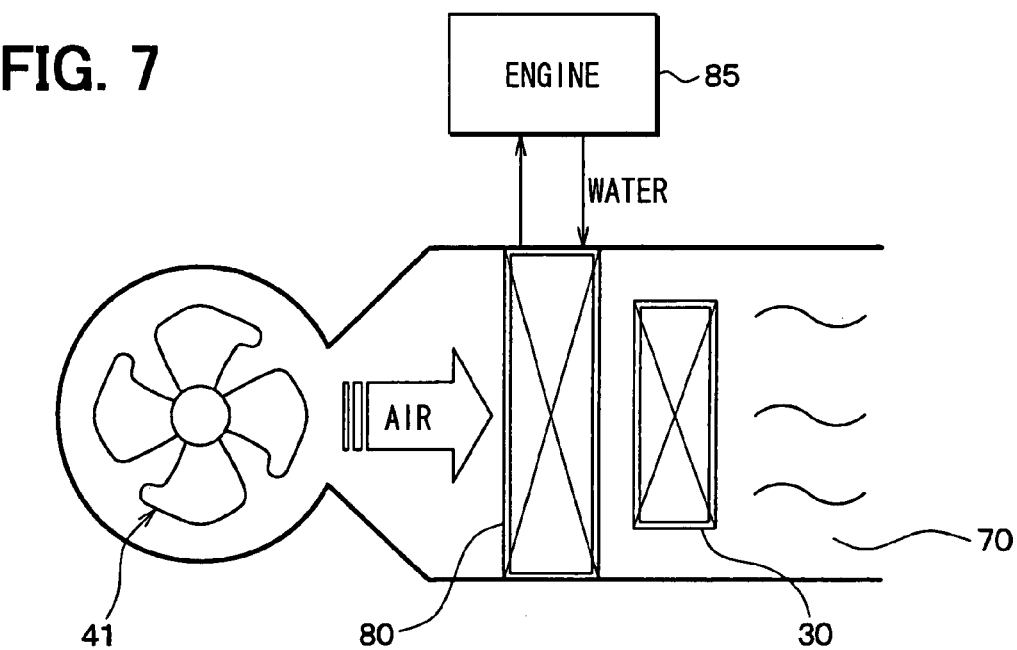
FIG. 7 is a schematic diagram showing a state in which a heater core is disposed in an air conditioning unit in the third embodiment.

85 shown in FIG. 7. The heater core 80 is disposed between the blower 41 and the PTC heater 30 in an air flow direction as shown in FIG. 7, so as to supply the heated hot air into the air conditioning duct 70. That is, air to be blown by the blower 41 into the air conditioning duct 70 can be heated by at least one of the heater core 80 and the PTC heater 30.

The ECU 20 has, in addition to the function shown in the first embodiment, a heating continuation program for stopping energization of the PTC heater 30 when the abnormal temperature of the drive transistor 13 continues.

Figure 8:
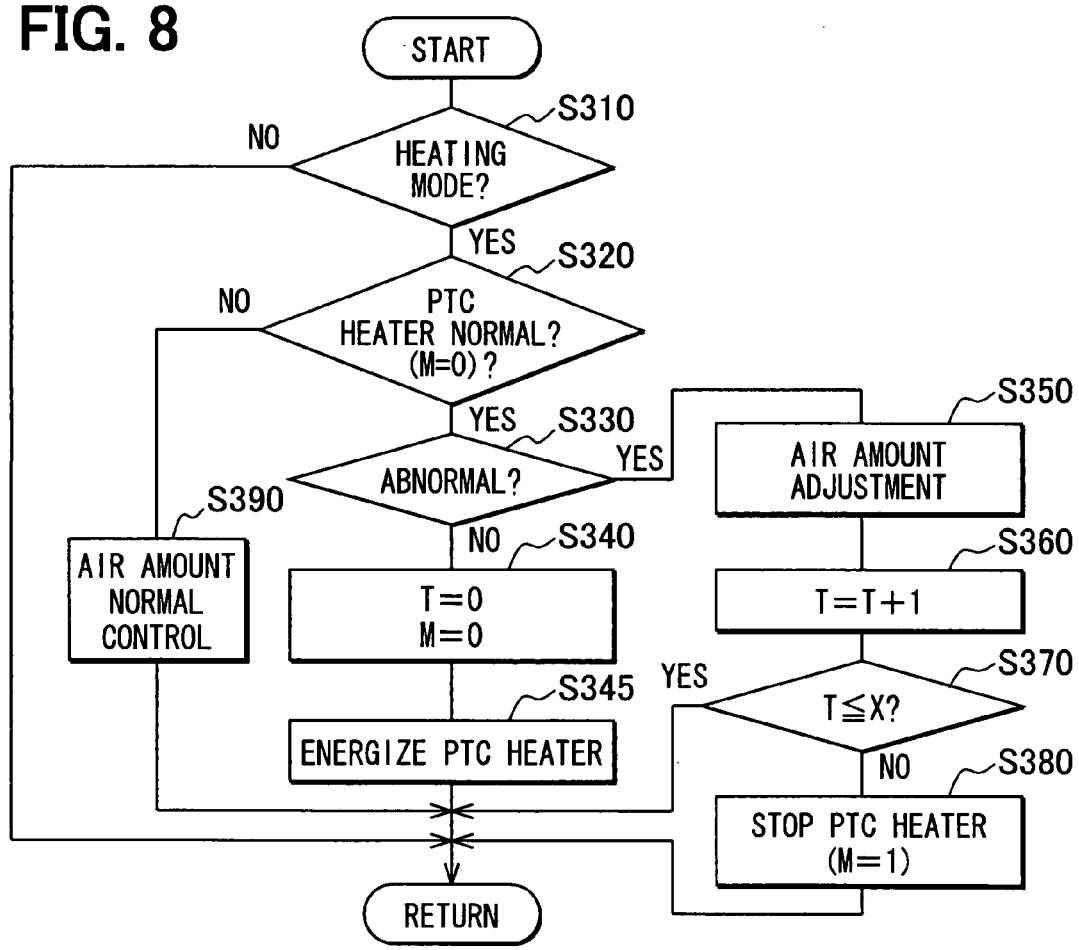
FIG. 8 is a flowchart showing a heating continuation program in the third embodiment.

FIG. 8 is a flowchart showing contents of the heating continuation program according to the third embodiment. Once the ECU 20 starts to be energized by the power source 50, the control procedure shown in the flowchart of FIG. 8 is executed by the ECU 20.

In Step S310, it is determined whether the system is in a heating mode or not. That is, it is determined whether or not the heating mode is selected on an operation panel in a vehicle compartment and whether or not the heating mode is held by the ECU 20. When the system is determined to be in the heating mode in Step S310, the control program proceeds to Step S320. When the system is determined not to be in the heating mode, the control procedure shown in FIG. 8 is restarted.

In Step S320, it is determined whether the normal driving of the PTC heater 30 is performed or not. That is, it is determined whether a flag M is zero (M=0) or not. The numerical value "0" of the flag M means a normal state, whereas "1" means an abnormal state. When the driving operation of the PTC heater 30 is determined to be normal in Step S320, the control program proceeds to Step S330. When the driving operation of the PTC heater 30 is determined not to be normal, the control program proceeds to Step S390. This case will be explained later.

In Step S330, the same process as that of Step S110 or S210 is performed. That is, it is determined whether the temperature of the drive transistor 13 is abnormal or not. When the temperature of the drive transistor 13 is determined not to be abnormal in Step S330, the control program proceeds to Step S340.

In Step S340, the timer and the flag are reset. That is, the time T is set to zero (T=0), and the flag M indicative of the normal driving of the PTC heater 30 is set to zero (M=0).

In Step S345, the PTC heater 30 is energized. Specifically, first, a command signal for energizing the PTC heater 30 is input from the ECU 20 to the input signal processor 11 of the load drive controller 10, and then the command signal is processed into an input processing signal, which is input to the driving circuit 12. The driving circuit 12 generates a drive signal according to the contents of the input processing signal, which is input to the gate of the drive transistor 13. Thus, the drive transistor 13 is turned on, and the PTC heater 30 is energized from the power source 50. In this way, after this procedure of Step S345 shown in the flowchart of FIG. 8 is completed, the control program returns to Step S310 so that the control process is executed again.

When the temperature of the drive transistor 13 is determined to be abnormal in Step S330, the control program proceeds to Step S350. In Step S350, the same process as that of Step S130 of FIG. 4 is performed. That is, the number of revolutions of the blower motor 40 is decreased, resulting in a decrease in air volume sent from the blower 41. This increases the temperature of the PTC heater 30, and also the resistance value of the PTC heater 30. Together with this increase, the current passing through the PTC heater 30 is decreased, resulting in a decrease in current passing through the drive transistor 13. In this way, the heat generation of the drive transistor 13 can be reduced, and the temperature of the drive transistor 13 can be decreased.

In Step S360, the same process as that in Step S230 can be performed. That is, one (1) is added to the time T, thereby providing new time T (T=T+1) as the result of this computation.

In Step S370, the same process as that in Step S240 is performed. That is, it is determined whether or not the time T satisfies the condition of T≦X. The term X as used herein is the monitoring time for monitoring the abnormal temperature of the drive transistor 13 until the PTC heater 30 is stopped.

When the time T satisfies the condition of T≦X in Step S370, it is determined that the time T does not reach the monitoring time X, and this control procedure shown in the flowchart of FIG. 8 is terminated. Then, the control procedure shown in the flowchart is executed again. When the time T does not satisfy the condition of T≦X, it is determined that the time T exceeds the monitoring time X, and the control program proceeds to Step S380.

In Step S380, the energization of the PTC heater 30 is stopped, and the flag M indicative of the abnormal driving of the PTC heater 30 is set to 1 (M=1). That is, a command for stopping the drive transistor 13 is input from the ECU 20 to the load drive controller 10, and the drive transistor 13 is stopped.

At this time (Step S380), the energization of the PTC heater 30 is stopped, while the blower motor 40 is driven. Furthermore, the engine coolant continues to be supplied from the engine 85 to the heater core 80. Thus, even when the driving of the PTC heater 30 is stopped, the warm air can be continuously blown to the air conditioning duct 70 as long as the air is continuously blown from the blower motor 40 to the heater core 80.

In this way, this control procedure from Step S380 shown in the flowchart of FIG. 8 is terminated, and then the control procedure shown in the flowchart of FIG. 8 is performed again. In this case, because the driving state of the PTC heater 30 is not normal, the flag M is set to 1 (M=1). When the heating mode is maintained in this state of M=1, the procedure shown in FIG. 8 is started, and the control program proceeds from Step S310 to Step S320. Thus, it is determined that the equation of M=0 is not satisfied in Step S320. In this case, the control program proceeds to Step S390.

In Step S390, the blower motor 40 is normally controlled such that the volume of blown air from the blower 41 is the same as that in the normal control. That is, the blower motor 40 is driven so as to keep the number of revolutions of the blower motor 40. As mentioned above, the driving state of the PTC heater 30 is not normal when Step S390 is performed. Even in this case, the blower motor 40 is operated so that air is heated by the heater core 80. After that, this control procedure shown in the flowchart of FIG. 8 is terminated, and the control procedure shown in the flowchart is performed again.

In the third embodiment, Step S390 corresponds to driving continuation means. In Step S390, the blower motor 40 is controlled such that the blown-air volume of the blower 41 is the same as that in the normal control.

As mentioned above, in this embodiment, even when the temperature of the drive transistor 13 for driving the PTC heater 30 becomes abnormal and the operation of the PTC heater 30 is stopped, the normal air-blowing operation of the blower motor 40 is carried out.

Thus, the blown air can be continuously supplied to the heater core 80 to which the engine coolant (hot water) is supplied, so that the warm air can be continuously supplied from the heater core 80 to the air conditioning duct 70. Therefore, the abnormal temperature of the drive transistor 13 does not shut down or stop the entire system, while the warm air can continue to be supplied to the air conditioning duct 70.

Fourth Embodiment

In a fourth embodiment, different parts from the third embodiment will be mainly described below. In this embodiment, when the operation of the PTC heater 30 is stopped, the idle up of the engine 85 is performed to increase the temperature of the engine coolant, thereby preventing a decrease in heating capacity of the heater core 80.

Figure 9:
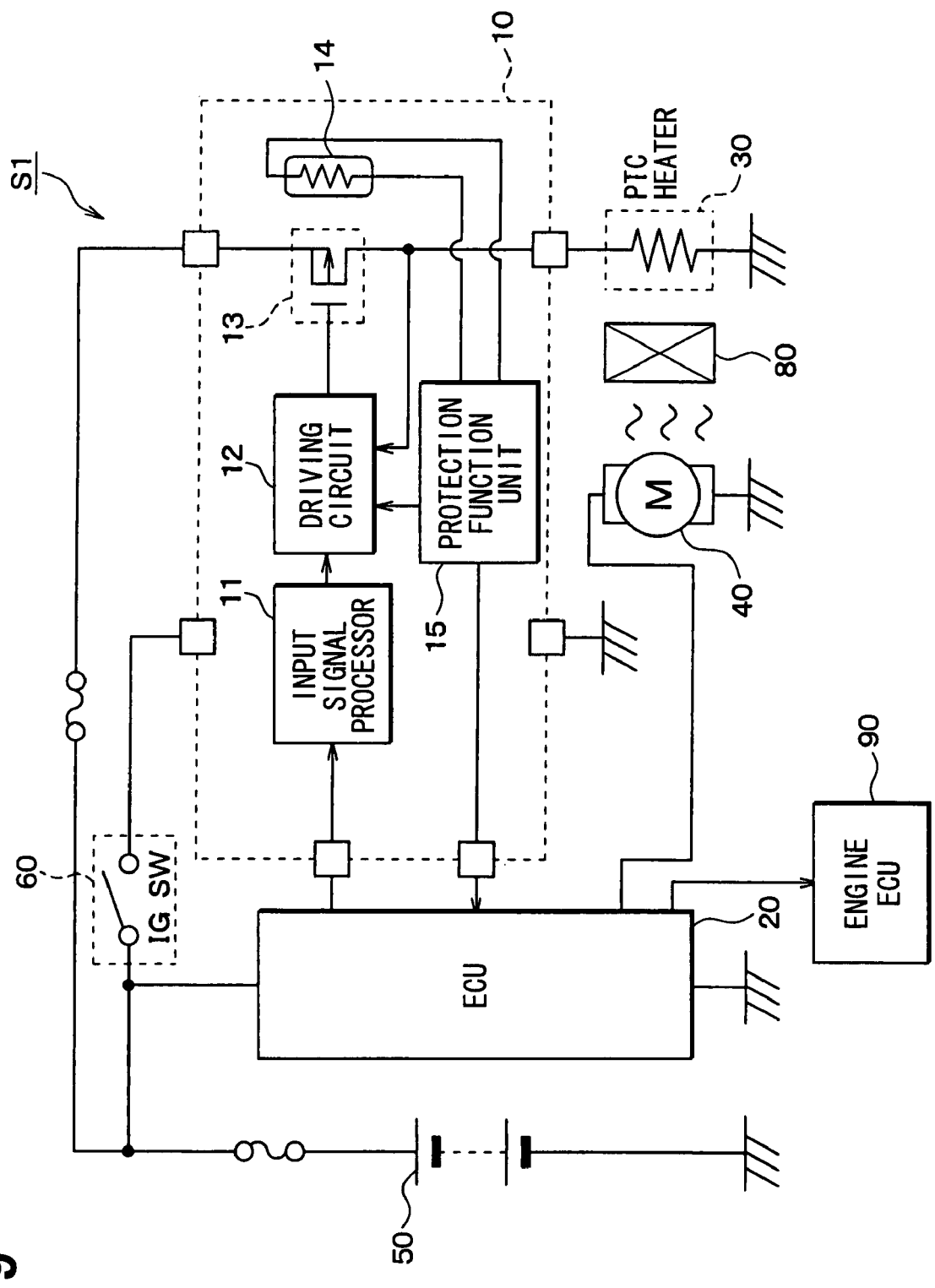
FIG. 9 is a schematic diagram of a load drive control system according to a fourth embodiment of the present invention.

FIG. 9 is a construction diagram of a load drive control system according to the fourth embodiment of the present invention. As shown in FIG. 9, an engine ECU 90 is connected to the ECU 20 of the load drive control system via a LAN or the like in the vehicle compartment. The engine ECU 90 is provided to control ignition of an ignition plug mounted on the engine 85. The engine ECU 90 is engine control means in this embodiment.

Figure 10:
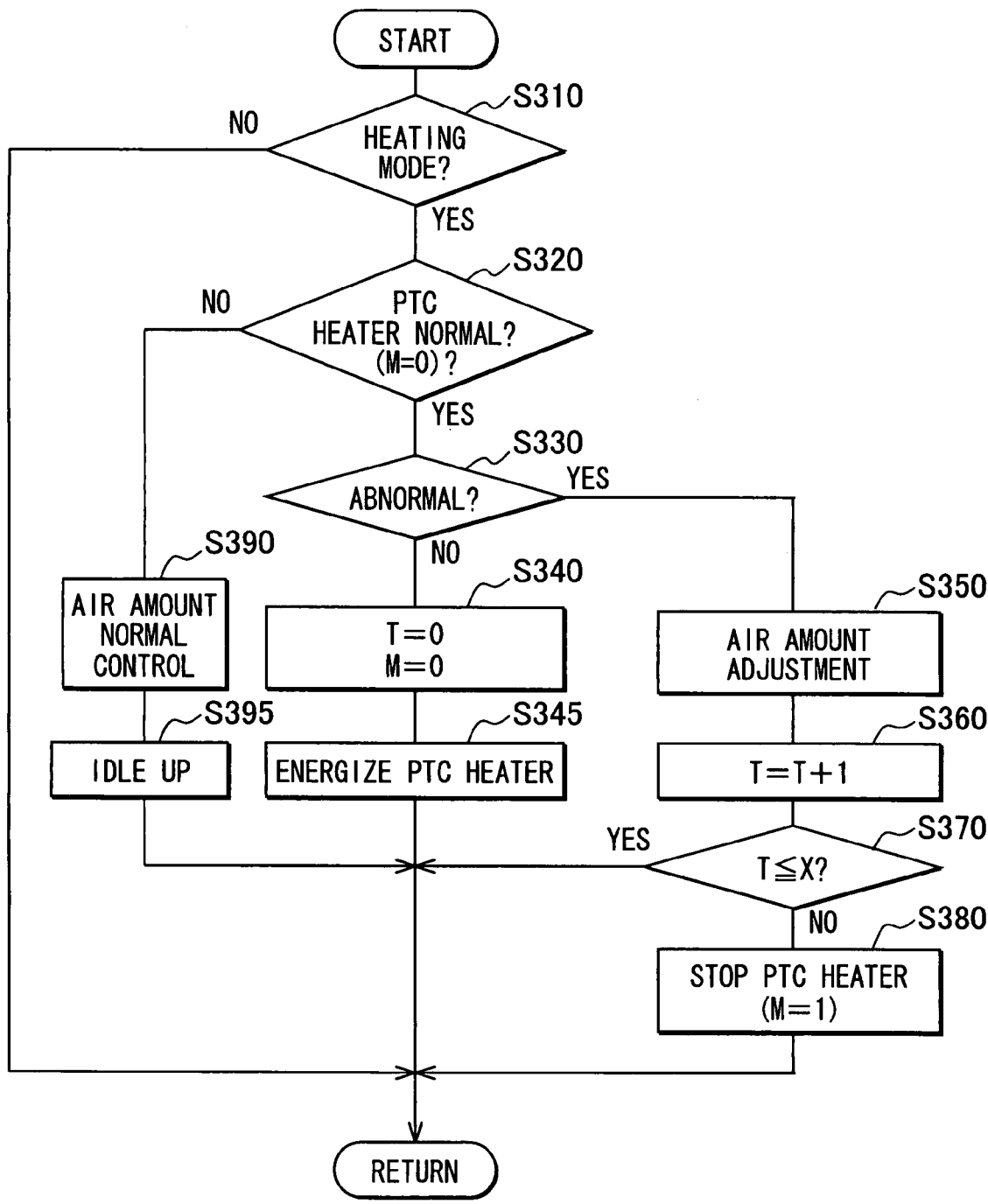
FIG. 10 is a flowchart showing an idle-up program according to the fourth embodiment.

The ECU 20 has an idle-up program for idle up which involves increasing the engine speed of the engine 85 when the energization of the PTC heater 30 is stopped. FIG. 10 is a flowchart showing contents of the idle up program of the embodiment. The procedure shown in this flowchart is executed once the ECU 20 starts to be energized by the power source 50. This flowchart showing the idle-up program is constructed by adding Step S395 to Step S390 in the flowchart shown in FIG. 8. In the fourth embodiment, the other control parts other than Step S395 in FIG. 10 may be the same as those of FIG. 8.

That is, when the temperature of the drive transistor 13 for driving the PTC heater 30 becomes abnormal, the driving of the PTC heater 30 is stopped, and the normal driving of the blower motor 40 is performed in Step S390. Thereafter, the idle up is performed in Step S395.

Specifically, an idle-up signal for ordering the idle up is input from the ECU 20 to the engine ECU 90. Together with this, the engine ECU 90 performs idle up for increasing the engine speed of the engine 85. Thus, the temperature of the engine coolant is increased higher than that before the idle up, so that the engine coolant is supplied to the heater core 80. In this way, the temperature of the engine coolant passing through the heater core 80 is increased higher than that before the idle up, thereby enabling prevention of decrease in heating capacity of the heater core 80.

When the operation of the PTC heater 30 is stopped, the command of the idle up is given from the ECU 20 to the engine ECU 90 so as to increase the engine speed of the engine 85, thereby achieving the idle up of the engine 85. This results in an increase in temperature of the engine coolant, thereby preventing a decrease in heating capacity of the heater core 80.

Fifth Embodiment

In this embodiment, different parts from each of the above-mentioned embodiments will be described below. When the temperature of the drive transistor 13 for driving the PTC heater 30 becomes abnormal, the driving of the drive transistor 13 is stopped, or the entire system may be stopped or shut down also in this embodiment, as described in the above-mentioned embodiments. Additionally, in this embodiment, when the temperature of the drive transistor 13 decreases not to be abnormal, the PTC heater 30 starts to be energized to return to a normal mode.

Therefore, in this embodiment, the ECU 20 is provided with a normal return program for transforming to the normal control when the temperature of the drive transistor 13 decreases after stopping of the energization of the PTC heater 30.

Figure 11:
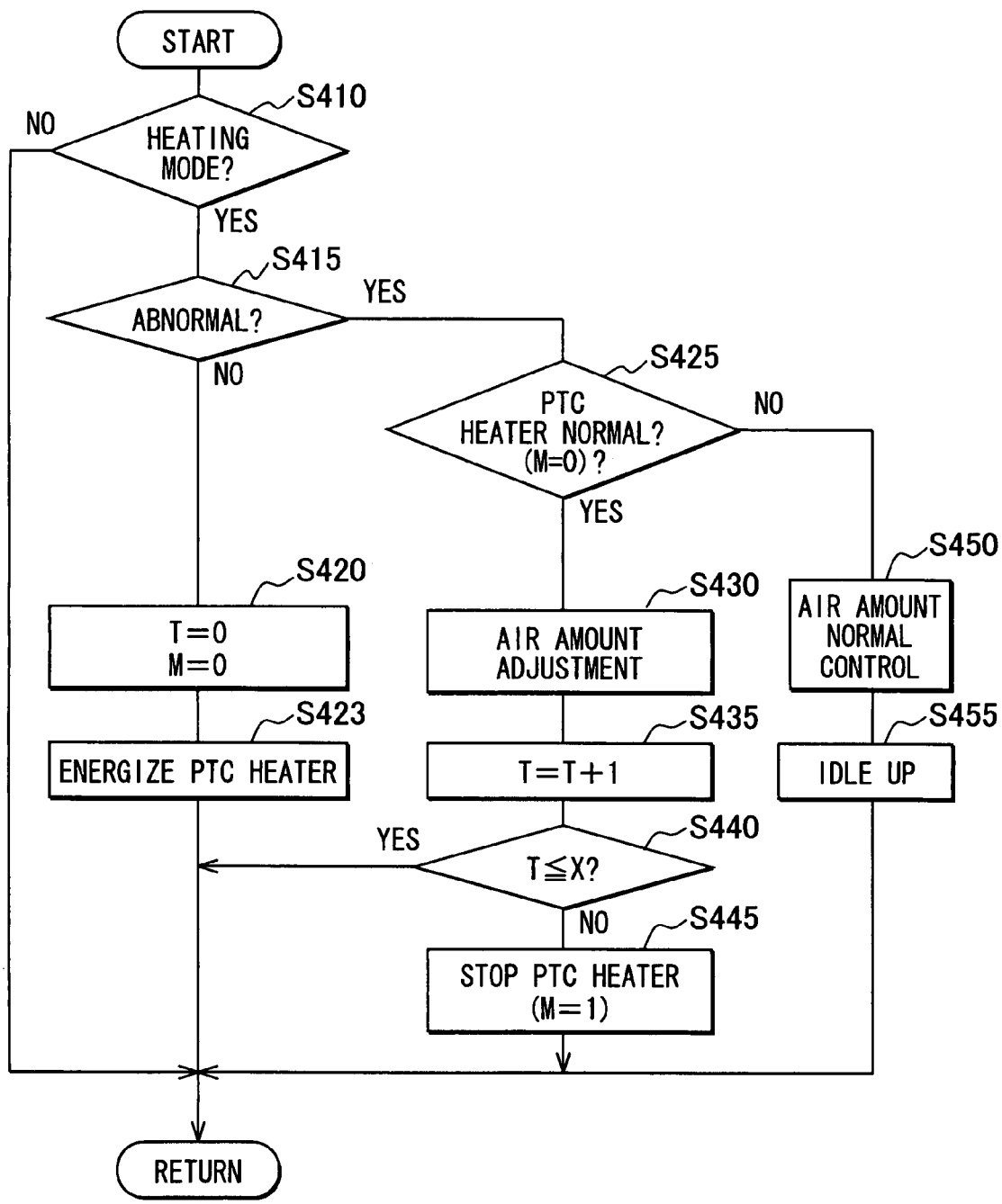
FIG. 11 is a flowchart showing a control program according to a fifth embodiment of the present invention.

FIG. 11 is a flowchart showing the normal return program according to the embodiment. The control procedure of FIG. 11 shown in this flowchart is executed when the ECU 20 starts to be energized by the power source 50. First, when the control procedure shown in this flowchart is started, the same process as that in Step S310 is performed in Step S410 of FIG. 11. That is, it is determined whether the system is in a heating mode or not. When the system is determined to be in the heating mode, the control program proceeds to Step S415. When the system is determined not to be in the heating mode, the control procedure shown in the flowchart of FIG. 11 is executed again.

In Step S415, the same process as that of Step S110 is performed. That is, it is determined whether the temperature of the drive transistor 13 is abnormal or not. When the temperature of the drive transistor 13 is determined not to be abnormal, the control program proceeds to Step S420.

In Step S420, the same process as that of Step S340 is performed. The timer and the flag are reset in Step S420. Thereafter, in Step S423, the same process as that of Step S345 is performed, and the PTC heater 30 is energized. After this control of Step S423 is performed, the control procedure shown in FIG. 11 is executed again.

When the temperature of the drive transistor 13 is determined to be abnormal in Step S415, the control program proceeds to Step S425, in which it is determined whether the normal driving of the PTC heater 30 is performed or not in the same manner as that in Step S320.

When the normal driving of the PTC heater 30 is determined to be performed, the control processes in Steps S430, S435, S440, and S445 are performed. These processes shown in Steps S430, S435, S440, and S445 are the same as those in Steps S350, S360, S370, and S380. When the normal driving of the PTC heater 30 is determined not to be performed, the processes in Steps S450 and S455 are performed. The processes in Steps S450 and S455 are the same as those in Steps S390 and S395. This control procedure shown in the flowchart of FIG. 11 is terminated, and the control procedure shown in the flowchart can be executed again.

According to the fifth embodiment, when the temperature of the drive transistor 13 decreases not to be abnormal, it is determined that the temperature of the drive transistor 13 is not abnormal in Step S415, and the control program proceeds to Step S420. In this case, a command for driving the drive transistor 13 is output from the ECU 20 to the load drive controller 10, so that the driving of the drive transistor 13 is restarted. In this way, in a case where the temperature of the drive transistor 13 become normal after being brought into the abnormal state, the normal driving of the drive transistor 13 can be performed.

As mentioned above, even if the temperature of the drive transistor 13 becomes abnormal and the driving of the drive transistor 13 is stopped to stop the energization of the PTC heater 30, the normal driving of the drive transistor 13 can be restored (restarted) when the temperature of the drive transistor 13 decreases and does not become abnormal.

As mentioned above, in the fifth embodiment, when the system is not problematic from a viewpoint of safety, the energization of the PTC heater 30 can be restored. However, like the third and fourth embodiments, when the system is stopped and the energization of the PTC heater 30 is stopped at the last process stage, the energization of the PTC heater 30 may be not restored.

Other Embodiments

Although the present invention has been fully described in connection with the preferred embodiments thereof with reference to the accompanying drawings, it is to be noted that various changes and modifications will become apparent to those skilled in the art.

For example, in each of the above-mentioned embodiments, the load drive control system S1 is used for control of air conditioning of a vehicle, but may be used for other control of load driving, such as a heater. Furthermore, although each of the embodiments describes the load drive control system S1, a load drive controller constructed of a part of components (e.g., thermistor 14, protection function unit 15, or ECU 20) of the load drive control system S1 may be used for control of the load driving.

In each of the above-mentioned embodiments, a Pch-type MOS transistor may be adopted as the drive transistor 13, but any other transistor, such as an Nch type or a bi-polar type transistor, may be employed. The drive transistor 13 is connected to the high-side of the PTC heater 30, but may be connected to the low-side of the PTC heater 30.

In each of the above-mentioned embodiments, the number of PTC heater 30 serving as the load is one. However, a number of loads may be controlled. In this case, the drive transistor 13 corresponding to each load may be prepared.

In each of the above-mentioned embodiments, the ECU 20 and the load drive controller 10 are independently provided. However, for example, the load drive controller 10 may be integrally made in the ECU 20 or the like.

In the above-mentioned embodiment, the blower motor 40 is employed as means for decreasing the temperature of the PTC heater 30. However, any other element or the like for absorbing heat generated from the PTC heater 30 may be used instead of the blower motor 40.

In each of the above-mentioned embodiments, the drive transistor 13 and the thermistor 14 are independently provided. However, for example, a drive transistor 13 incorporating therein a temperature sensing element may be employed. In this case, the temperature of heat generated from the drive transistor 13 can be detected with better accuracy.

When the overheating of the drive transistor 13 continues with the air volume of the blower 41 being minimum, a method for shifting energization of the PTC heater 30 from the drive transistor 13 to low power consumption may be combined with the method of the present invention.

Specifically, the methods include a method of switching the energization of the PTC heater from linear control to pulse control, a method of decreasing a gate voltage applied to the drive transistor 13, a method of decreasing a PWM frequency, a method of decreasing an energization duty ratio of the PWM driving, and the like. These methods are performed by inputting command signals indicative of these methods from the ECU 20 to the load drive controller 10. In this way, the current passing through the drive transistor 13 can be decreased to reduce the heat generation of the drive transistor 13, thereby protecting the drive transistor 13 from overheating without stopping the entire system.

The steps shown in each figure correspond to means for achieving respective functions. The respective steps shown in the flowcharts of FIGS. 4, 5, 8, 10, and 11 can be constructed as hardware.

Such changes and modifications are to be understood as being within the scope of the present invention as defined by the appended claims.

What is claimed is:

1. A load drive controller for controlling a temperature of a heat generating member by switching energization of the heat generating member from a power source using a switching element via a driving portion for driving the switching element, wherein heat generated by the heat generating member is absorbed by a temperature adjustment portion so as to adjust the temperature of the heat generating member, the load drive controller comprising:

a temperature detection means for detecting a physical quantity of a level corresponding to a temperature of the switching element;

a protection function means for outputting an abnormality signal corresponding to an overheated state of the switching element when the physical quantity detected by the temperature detection means exceeds a value at which the switching element is estimated to be in the overheated state; and a control means for causing the heat generating member to generate heat by driving the switching element via the driving portion, wherein the control means causes the temperature adjustment portion to increase the temperature of the heat generating member when the abnormality signal is input from the protection function means.

2. The load drive controller according to claim 1, wherein the control means includes:

abnormality determination means for determining whether the abnormality signal is input from the protection function means; and temperature control means for causing the temperature adjustment portion to adjust the temperature of the heat generating member so as to increase the temperature of the heat generating member when the abnormality determination means determines that the abnormality signal is input from the protection function means.

3. The load drive controller according to claim 1, wherein the protection function means outputs a command to the driving portion to drive the switching element such that current passing through the switching element is decreased when the physical quantity input from the temperature detection means exceeds the value at which the switching element is estimated to be in the overheated state.

4. The load drive controller according to claim 1, wherein the control means includes:

abnormality determination means for determining whether the abnormality signal is input from the protection function means;

time monitoring means for monitoring whether the abnormality signal continues to be input for a predetermined time period when the abnormality determination means determines that the abnormality signal is input; and stopping means for causing the driving portion to stop driving of the switching element and for stopping driving of the temperature adjustment portion when the time monitoring means determines that the abnormality signal continues to be input for the predetermined time period.

5. The load drive controller according to claim 1, wherein the control means controls the driving portion to stop the driving of the switching element when the temperature adjustment portion performs a normal control in a case where the abnormality signal continues to be input for a predetermined time period.

6. The load drive controller according to claim 5, wherein the control means includes a driving continuation means for continuing the driving of the temperature adjustment portion when the driving of the switching element is stopped by the driving portion.

7. The load drive controller according to claim 6, wherein, when the driving of the temperature adjustment portion is continued via the driving continuation means, the control means inputs an idle-up signal for increasing a rotation speed of an engine to an engine control means so as to increase the rotation speed of the engine.

8. The load drive controller according to claim 2, wherein the abnormality determination means is a temperature determination means for determining whether a temperature abnormality signal is input from the protection function means.

9. A load drive controller for controlling a temperature of a heat generating member by switching energization of the heat generating member from a power source using a switching element via a driving portion for driving the switching element, wherein a temperature adjustment portion is provided for adjusting the temperature of the heat generating member by absorbing heat generated from the heat generating member and heat generated from a heater heated by an engine-cooling water supplied from an engine, the load drive controller comprising:
   a temperature detection means located to detect a physical quantity of a level corresponding to a temperature of the switching element;
   a protection function means for outputting an abnormality signal corresponding to an overheated state of the switching element when the physical quantity detected by the temperature detection means exceeds a value at which the switching element is estimated to be in the overheated state; and
   a control means for causing the heat generating member to generate heat by driving the switching element via the driving portion,
   wherein the control means controls the temperature adjustment portion so as to increase the temperature of the heat generating member when the abnormality signal is input from the protection function means, and
   wherein the control means causes the driving portion to stop the driving of the switching element when the temperature adjustment portion performs a normal control in a case where the abnormality signal continues to be input for a predetermined time period.

10. The load drive controller according to claim 9, wherein the control means includes a driving continuation means for continuing the driving of the temperature adjustment portion when the driving of the switching element is stopped by the driving portion.

11. The load drive controller according to claim 10, wherein,
   when the driving of the temperature adjustment portion is continued via the driving continuation means, the control means inputs an idle-up signal for increasing a rotation speed of an engine to an engine control means so as to increase the rotation speed of the engine.

12. The load drive controller according to claim 1, wherein the switching element is a drive transistor.

13. A load drive control system comprising:
   a heat generating member which generates heat when current is supplied thereto;
   a switching element for switching energization of the heat generating member from a power source;
   a driving portion for driving the switching element to be turned on or off;
   a temperature adjustment portion for adjusting a temperature of the heat generating member by absorbing heat generated from the heat generating member;
   a temperature detection portion located to detect a physical quantity of a level corresponding to a temperature of the switching element;
   a protection function portion which outputs an abnormality signal corresponding to an overheated state of the switching element when the physical quantity detected by the temperature detection portion exceeds a value at which the switching element is estimated to be in the overheated state; and
   a control portion for causing the heat generating member to generate heat by driving the switching element via the driving portion,
   wherein the control portion controls the temperature adjustment portion so as to increase the temperature of the heat generating member when the abnormality signal is input from the protection function portion.

14. The load drive control system according to claim 13, wherein the temperature adjustment portion includes a blower for blowing air to the heat generating member.

15. The load drive control system according to claim 14, wherein the heat generating member is a PTC heater for heating air blown from the blower.

16. A load drive control system comprising:
   a heat generating member which generates heat when current is supplied thereto;
   a heater heated by an engine-cooling water supplied from an engine;
   a switching element for switching energization of the heat generating member from a power source;
   a driving portion for driving the switching element to be turned on or off;
   a temperature adjustment portion for adjusting a temperature of the heat generating member by absorbing heat generated from the heat generating member and heat generated from the heater;
   a temperature detection portion located to detect a physical quantity of a level corresponding to a temperature of the switching element;
   a protection function portion which outputs an abnormality signal corresponding to an overheated state of the switching element when the physical quantity detected by the temperature detection portion exceeds a value at which the switching element is estimated to be in the overheated state; and
   a control portion for causing the heat generating member to generate heat by driving the switching element via the driving portion,
   wherein the control portion controls the temperature adjustment portion so as to increase the temperature of the heat generating member when the abnormality signal is input from the protection function portion, and
   wherein the control portion causes the driving portion to stop the driving of the switching element when the temperature adjustment portion performs a normal control in a case where the abnormality signal continues to be input for a predetermined time period.

\* \* \* \* \*